(12) United States Patent
Tokizawa

(10) Patent No.: US 11,218,037 B2
(45) Date of Patent: Jan. 4, 2022

(54) STATOR AND HOUSING FOR ROTATING ELECTRICAL MACHINE

(71) Applicant: DENSO CORPORATION, Kariya (JP)

(72) Inventor: Takashi Tokizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 584 days.

(21) Appl. No.: 15/776,681

(22) PCT Filed: Nov. 7, 2016

(86) PCT No.: PCT/JP2016/082904
§ 371 (c)(1),
(2) Date: May 16, 2018

(87) PCT Pub. No.: WO2017/086192
PCT Pub. Date: May 26, 2017

(65) Prior Publication Data
US 2018/0331587 A1 Nov. 15, 2018

(30) Foreign Application Priority Data
Nov. 17, 2015 (JP) .............................. JP2015-224796

(51) Int. Cl.
*H02K 1/18* (2006.01)
*H02K 15/02* (2006.01)
(Continued)

(52) U.S. Cl.
CPC ............... *H02K 1/18* (2013.01); *H02K 1/146* (2013.01); *H02K 1/16* (2013.01); *H02K 1/185* (2013.01);
(Continued)

(58) Field of Classification Search
CPC H02K 1/18; H02K 1/146; H02K 1/16; H02K 1/185; H02K 5/15; H02K 15/02; H02K 2213/03
See application file for complete search history.

(56) References Cited

U.S. PATENT DOCUMENTS

| 2002/0153794 A1* | 10/2002 | Kawasaki | H02K 1/185 310/156.08 |
| 2006/0001328 A1 | 1/2006 | Rau et al. | |

(Continued)

FOREIGN PATENT DOCUMENTS

| JP | 2001-112197 A | 4/2011 |
| JP | 2014-045641 A | 3/2014 |

*Primary Examiner* — Minh N Trinh
(74) *Attorney, Agent, or Firm* — Oliff PLC

(57) ABSTRACT

A rotating electrical machine having holding surfaces on a pair of housings which firmly holds a stator core made of a core stack. The holding surfaces have a small-diameter first annular surface and a large-diameter second annular surface arranged at different locations in the axial direction. The surfaces in contact with inner and outer circumferential regions of a yoke hold the core. Two contacts between the housing and core are in different locations on a radial and axial direction. An outer peripheral side of the yoke where plate thickness is smaller and an inner peripheral side where plate thickness is larger are pressed individually in the axial direction. A firm holding feature suitable for configuration of the yoke is ensured to setting a difference in level between the contacts Eliminating problems about gaps created between layers of the core stack without any changes to the structure of the core stack.

8 Claims, 9 Drawing Sheets

(ENLARGED PORTION A)

(51) Int. Cl.
*H02K 1/14* (2006.01)
*H02K 5/15* (2006.01)
*H02K 1/16* (2006.01)

(52) U.S. Cl.
CPC ............... *H02K 5/15* (2013.01); *H02K 15/02* (2013.01); *H02K 2213/03* (2013.01)

(56) References Cited

U.S. PATENT DOCUMENTS

| | | | | |
|---|---|---|---|---|
| 2009/0083965 | A1* | 4/2009 | Tokizawa | H02K 15/026 29/596 |
| 2011/0243768 | A1* | 10/2011 | Taema | H02K 3/522 417/410.1 |
| 2012/0175996 | A1* | 7/2012 | Ikuta | H02K 1/148 310/216.134 |
| 2012/0306300 | A1 | 12/2012 | Ishikawa et al. | |

* cited by examiner (ENLARGED PORTION A)

STATOR AND HOUSING FOR ROTATING ELECTRICAL MACHINE

CROSS REFERENCE TO RELATED DOCUMENT

The present application claims the benefit of priority of Japanese Patent Application No. 2015-224796 filed on Nov. 17, 2015, the disclosure of which is incorporated herein by reference.

TECHNICAL FIELD

The present invention generally relates to a rotating electrical machine equipped with a stator core made of a cylindrical stacked core, and more particularly to a stator mounting mechanism suitable for a rotating electrical machine for use in severe environments, such as those to which automotive ac generator are usually subjected.

BACKGROUND ART

PRIOR ART

Recently, rotating electrical machines using a stack core as a stator core have mainly employed a stacked core made by helically winding a piece of band-like core sheet in which tooth portions or slots are stamped in an end thereof into cylindrical stacked layers instead of a stacked core made by stamping a magnetic plate into ring-shaped plates with tooth portions or slots formed in an inner periphery thereof and overlapping them into a cylindrical stack in terms of less waste material and an increased yield rate of material.

The stator core has the most distinct feature that a core sheet made of a strip-shaped magnetic plate (e.g., a steel plate) is used as core material. The core sheet is helically rolled up into a plurality of wound layers in the form of a cylindrical stacked core with slots formed in an inner periphery thereof.

In a winding process of the stacked core, the yoke portions 13 (opposite the slots) of the core sheet 10 are, as illustrated in FIGS. 2(c) and 2(d), subjected to a rolling operation to roll outer peripheries of the yoke portions 13 to be thin to form the tapered portions 14, thereby facilitating the helical rolling.

The helically wound cylindrical core stack 1 equipped with the tapered portions 14, however, has the tooth portions 11 which are smaller in wall thickness (i.e., a plate thickness) of the outer peripheries of the layers of the yoke portions 13 than the tooth portions 11, thereby causing, as illustrated in FIGS. 2(e) and 2(f), gaps S between the respective adjacent wounded layers, i.e., the outer peripheries of the core stack 1, which undesirably leads to various problems of quality or performance, as shown below.

For instance, if there are the gaps S arising from, for example, insufficient fastening of the core stack 1 which has, like typical automotive ac generators, opposed ends retained by a cup-shaped housing in a stacking direction (i.e., an axial direction) thereof, it may lead to a risk of corrosion due to accidental water exposure or accumulation of water in the gaps S or magnetic noise. A decrease in wall thickness (i.e., a plate thickness) of the outer peripheries of the tapered portions 14 of the yoke portions 13 will also result in an increase in size of the gaps S toward the outer edges of the tapered portions 14. Pressing the core stack 1 using the housing to decrease the gaps S, therefore, results in a difference in overall height in the stacking direction between the yoke portions 13 and the tooth portions 11 as a function of a decrease in the gap S, thereby causing, as indicated by a solid line in FIG. 4, an end surface (i.e., inner peripheries of the tooth portions 11) of the core stack 1 to be lifted up or excessive stress to be applied to fastening bolts or the housing.

The above lifting up may, as described later in detail, lead to damage to a stator coil, which result in concern about the quality or performance.

Various countermeasures have been studied to propose specific structures, but however, they are still impracticable. For instance, Japanese Patent First Publication No. 2001-112197 teaches a structure in which special thick annular plates are disposed on ends of the stacked core. Such a structure, however, needs additional members, thus resulting in an increase in size or production cost of the rotating electrical machine. Additionally, the gaps S still exist on the outer edges of the stacked core, thus still having a concern about a difficulty in eliminating the accidental water exposure or the magnetic noise.

The inventor of this application has performed various experiments and studies to solve the above problems and proposed a structure of the stacked core to alleviate the adverse effects of the gaps S (see Japanese Patent First Publication No. 2014-45641). Such a proposal is to make the outer peripheries of the yoke portions to have local thin portions as a structure which facilitates the rolling up of the core sheet, that is, produce a structure in which thin portions and thick portions are alternately arranged to eliminate the gaps S continuously existing between the peripheries of the stacked core instead of mill-rolling the whole of the outer periphery of each of the yoke portions to be thin without need for any additional parts. This proposal is expected as an effective countermeasure, but however, does not use a typical stacked core without any changes thereof. A way of alleviating the adverse effects of the gaps S directly using a typical stacked core is, therefore, sought.

The inventor of this application has found an effective way of providing, as results of this study, a stator mounting mechanism which is simple, inexpensive, and capable of directly using a typical stacked core to ensure high quality and high performance thereof.

SUMMARY OF THE INVENTION

This disclosure is provided in view of the above situations. It is an object of this disclosure to provide a rotating electrical machine which is suitable for use as an automotive ac generator and realizes a stator mounting mechanism. The stator mounting mechanism is produced by modifying a structure of housings serving to hold a core stack at end surfaces thereof opposed to each other in a stacking direction (i.e., an axial direction) without any changes to the structure of the core stack, has a simple and inexpensive structure, and is capable of fully solving the gas problem.

A rotating electrical machine, as described in claim 1, includes a stator core that is a cylindrical core stack produced by winding and stacking magnetic plate-made core sheets in an annular form and is equipped with tooth portions 11 and slot portions 12 provided on an inner peripheral side for coil winding and yoke portions 13 provided on an outer peripheral side. The yoke portions connect the tooth portions and the slot portions to form an annular magnetic path. The stator core is designed so that a thickness of the core sheets in the yoke portions is different between an inner peripheral region and an outer peripheral region. Specifically, the thickness in the outer circumferential region is smaller than that in the inner circumferential region. The housings which hold the stator core at surfaces thereof opposed to each other in an axial direction each have a holding surface which holds the stator core in the axial direction and includes a first annular surface and a second annular surface. The first annular surface faces the inner circumferential region of the yoke portions. The second annular surface is located outside the first annular surface in a radial direction, protrudes outside the first annular surface in the axial direction, and faces the outer circumferential region of the yoke portion. The housings hold the stator core by placing the first annular surfaces and the second annular surfaces in contact with the inner circumferential regions and the outer circumferential regions of the yoke portions in the axial direction.

With the above arrangements in this disclosure, the housings each have two portions: one contacting an inner peripheral portion of the yoke portion of the stator core, and the other contacting an outer peripheral portion of the yoke portion of the stator core. The adverse effects of the gaps may be alleviated by controlling the degree of axial force exerted on the first and second contacting portions. This offers the following beneficial advantages contributing to the realization of a stator mounting mechanism which has a simple and inexpensive structure, but, is excellent in quantity and performance.

(1) In an overall structural aspect, a spigot and socket joint mechanism is easily produced by reforming a circumferential edge of an opening of the housing to nip the stator core, thus enabling a core stack which has a typical structure to be used as the stator core without any changes thereto.
(2) The yoke portions of the stator core are pressed in the axial direction at two separate places which are different in location in the radial direction and the axial direction, thereby ensuring a firm holding feature suitable for the configuration of a section of the yoke portions.
(3) This eliminates exertion of excessive stress on the housings or fastening bolts and avoids lifting up of inner peripheries of end surfaces of the stator core and damage to a stator coil.
(4) Further, it is possible to eliminate the gaps in outer circumferential edges of the core stack, thereby eliminating problems about accidental water exposure, magnetic noise, or corrosion of the stator core caused by accumulation of water in the gaps.

BRIEF DESCRIPTION OF THE DRAWINGS

FIG. 1($a$) is a longitudinal sectional view of an upper half of an entire structure of the ac generator. FIG. 1($b$) is a front view of the upper half showing a form of a stator core itself.

FIG. 2($a$) is a front view of the above core sheet before wound. FIG. 2($b$) is a longitudinal sectional view of the core sheet. FIG. 2($c$) is a front view of the core sheet in a winding process. FIG. 2($d$) is a longitudinal sectional view of the core sheets. FIG. 2($e$) is a side view of a core stack. FIG. 2($f$) is a longitudinal sectional view of the core stack.

FIG. 5($a$) is a schematically longitudinal sectional view of highlights of a stator mounting mechanism. FIG. 5($b$) is an enlarged sectional view of a portion A in FIG. 5($a$).

FIGS. 8($a$) and 8($b$) are sectional views of holding surfaces that are highlights of the housings.

FIGS. 9($a$) and 9($b$) are a front view and a longitudinal sectional view of highlights of a core sheet in a winding process.

EMBODIMENTS FOR CARRYING OUT THE INVENTION

Figure 1A:
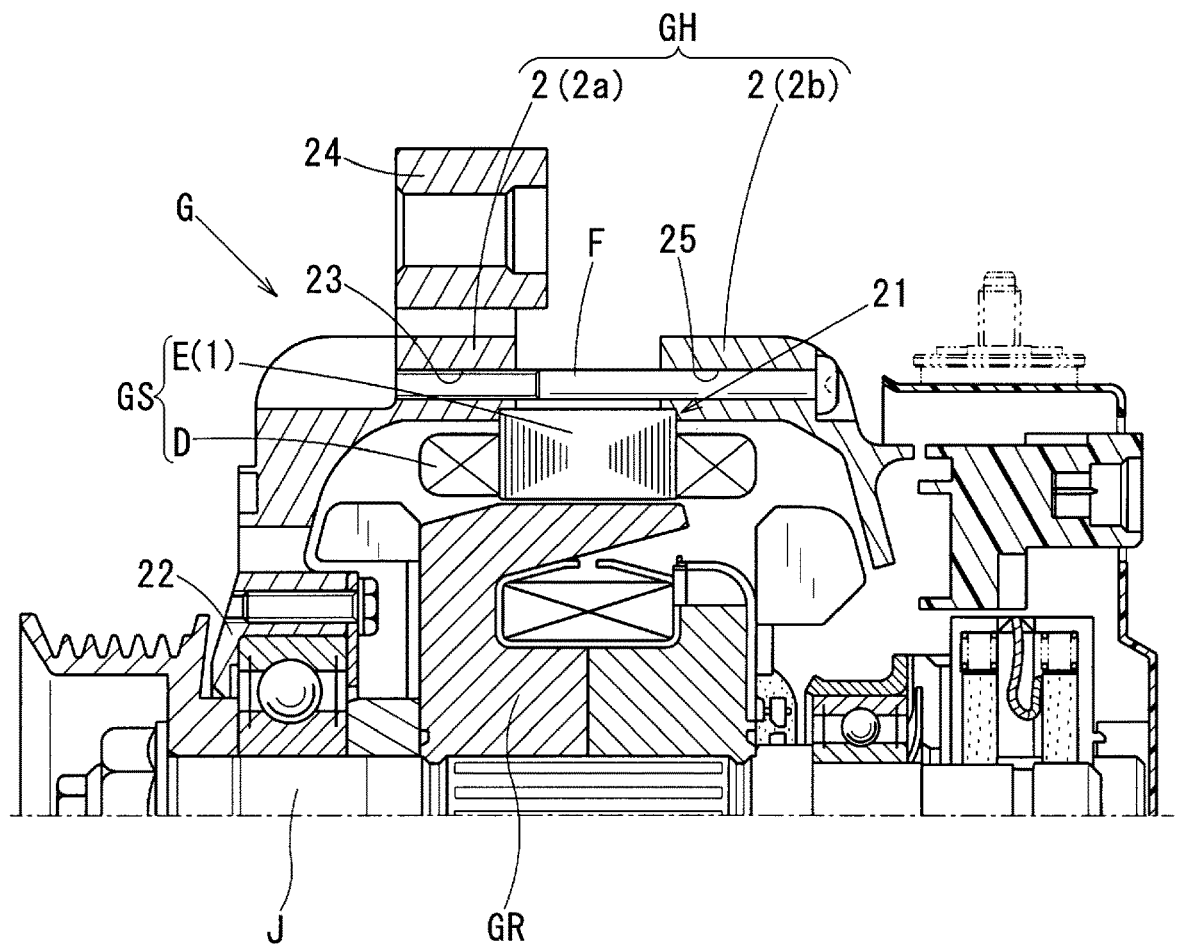
FIG. 1 schematically illustrates an automotive ac generator as a typical example of a rotating electrical machine in this disclosure (embodiment).

Embodiments of this disclosure will be described below with reference to the drawings.

Embodiments

Each of the embodiments refers to an ac generator (i.e., an alternator) for automotive vehicles as a typical example of a rotating electrical machine. The following discussion will first refer to an outline of a basic structure of the automotive ac generator, to features and basic operations in each of the embodiments and then to beneficial advantages offered by each of the features.

In the drawings, like reference numbers or symbols will refer to like parts throughout the several views. Explanation overlapping between the embodiments will be omitted.

Figure 1B:
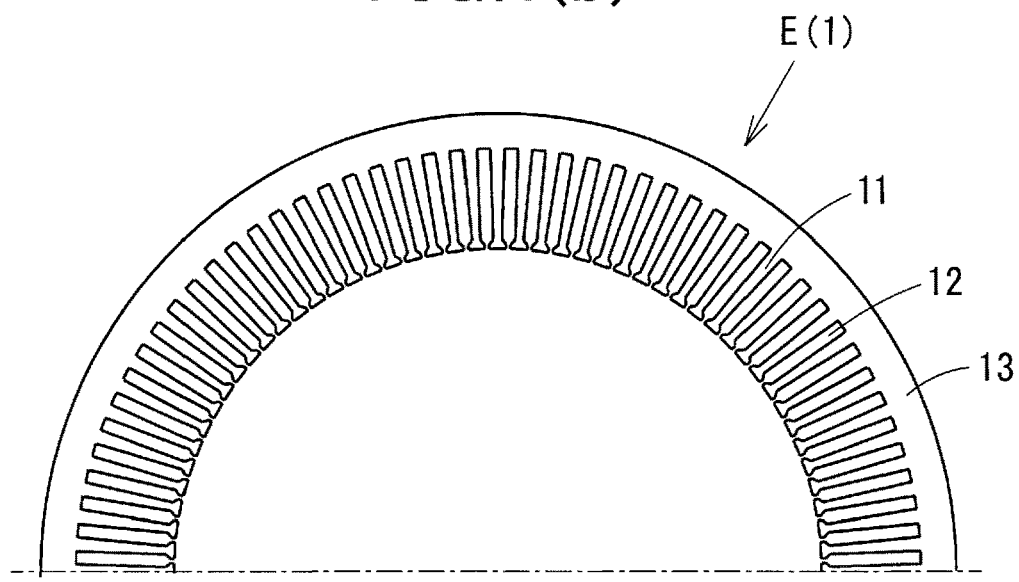
Figure 2A:
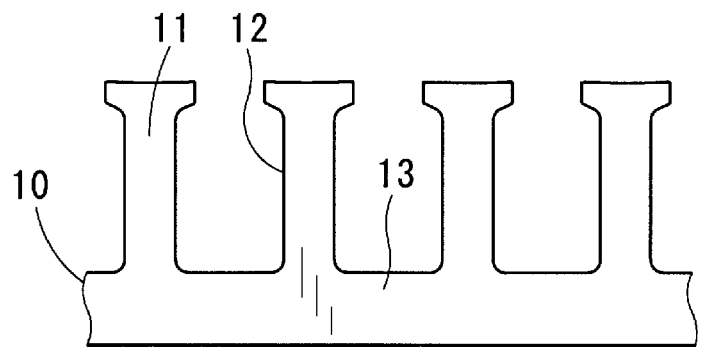
FIG. 2 is used for explaining a basic structure of a stator core (i.e., a core stack) of the above the rotating electrical machine (embodiment).
Figure 2B:
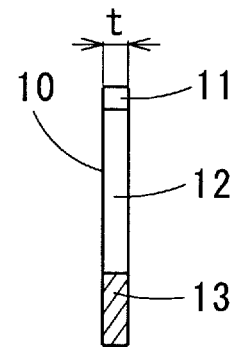
Figure 2C:
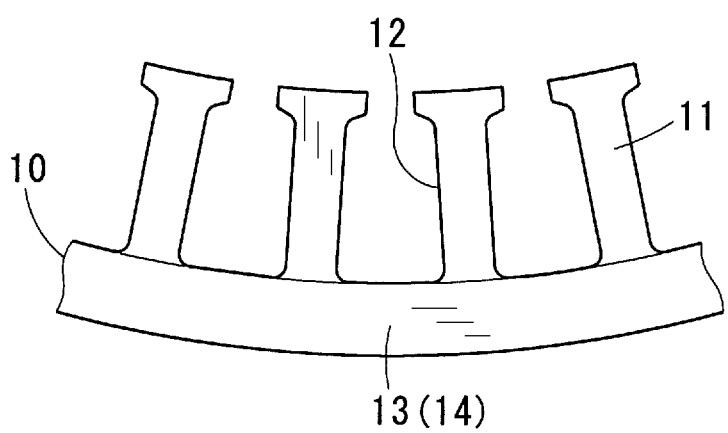
Figure 2D:
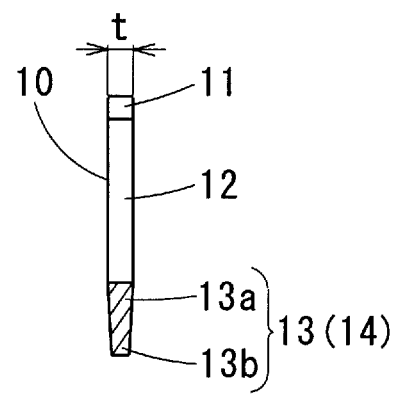
Figure 2E:
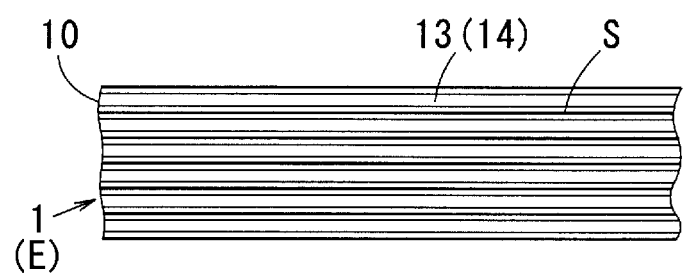
Figure 2F:
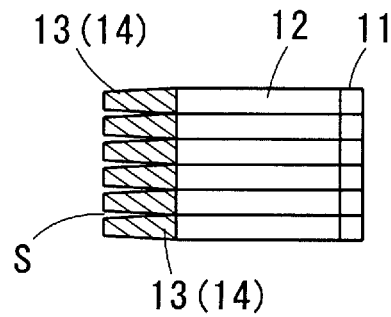

Matters common to the embodiments will be described below using FIGS. 1 to 4.
Basic Structure of AC Generator G The ac generator G is, as illustrated in FIG. 1($a$), secured to the rotating shaft J driven by an engine and equipped with the rotor GR acting as a field, the stator GS which is disposed around an outer periphery of the rotor GR as an armature, and the generator housing GH in which the stator GS and the rotor GR are disposed. The stator GS uses the stator core E as an iron core on which the stator coil (i.e., a multi-phase winding) D is disposed. The stator core E is made of the cylindrical core 1. The generator housing GH is made up of a pair of cup-shaped housings 2 which are secured to each other to hold the stator core E using fastening bolts F, thereby retaining the stator GS therebetween. The stator GS is firmly retained by the two housings 2, thereby employing the cylindrical stator core E as a portion of a housing of the ac generator G.

The stator core E is, as illustrated in FIG. 1($b$), made of the cylindrical core stack 1 equipped with a plurality of tooth portions (i.e., teeth) 11, the slot portions (i.e., grooves) 12, the yoke portion (i.e., a yoke) 13. The tooth portions 11 have inner peripheries around which the stator coil D is wound. The tooth portions 11 and the slot portions 12 are alternately arranged on an inner peripheral side of the stator core. The yoke portion 13 is located on an outer peripheral side of the stator core E and connects the tooth portions 11 and the slot portions 12 at given pitches to form an annular magnetic path. The annular yoke portion 13 is a non-winding portion around which the stator coil D is not wound, but is held by the two housings 2. The annular yoke portion 13 serves as a portion of a stator mounting mechanism which will be described later in detail.

Figure 3:
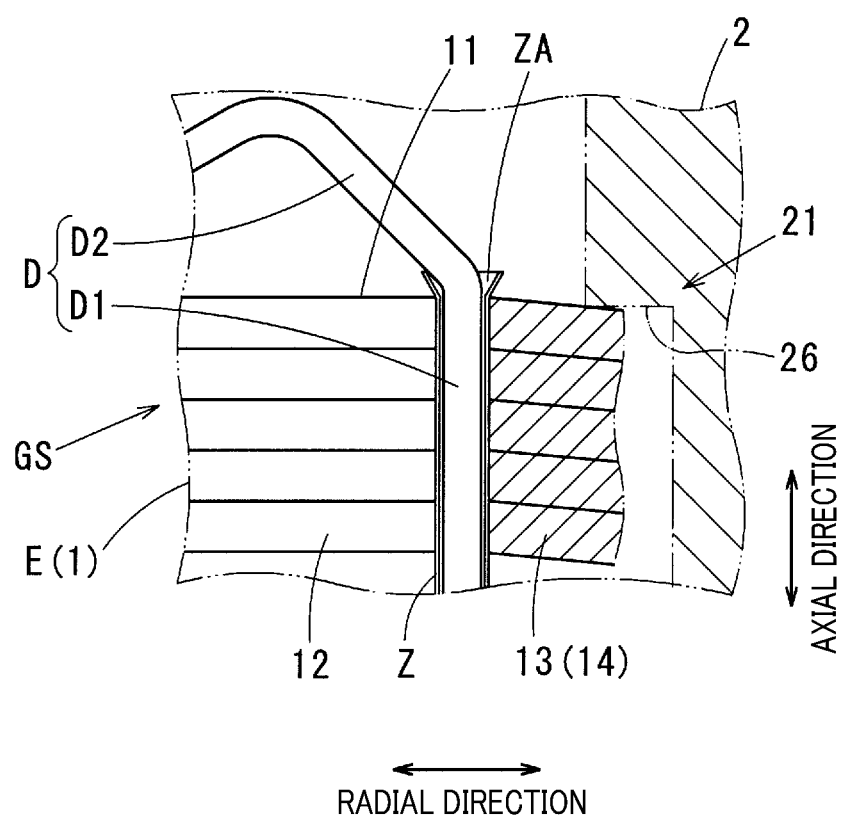
FIG. 3 is a sectional view of highlights of the above rotating electrical machine (embodiment).

In the stator GS, the stator coil D and the stator core E have a relation as illustrated in FIG. 3. The stator coil D has portions D1 which are inserted into the slot portions 12 and covered with the insulator (i.e., insulating paper) Z. The slant coil connecting portions (so called coil ends) D2 which protrude from the slot portions 12 in the axial direction are exposed on the side of an axial end surface of the stator core E.

Basic Structure of Core Stack 1

The core stack 1 that serves as the stator core E uses, as illustrated in FIGS. 2(*a*) and 2(*b*), the strip-shaped core sheets 10 as an iron core material. The core sheets 10 are produced by punching wide magnetic plates (e.g., steel plates) having a given plate thickness t into a pair of (i.e., two) strip-shaped core sheets in which the tooth portions 11 and the slot portions 12 are alternately formed. The core sheet 10 has the tooth portions 11 and the tooth portions 11 on one side thereof in the lengthwise direction around which the stator coil D is wound and also has the yoke portion 13 on the other side thereof in the lengthwise direction. The yoke portion 13 connects the tooth portions 11 and the slot portions 12 at given pitches to from the annular magnetic path. The cylindrical core stack 1 illustrated in FIGS. 2(*e*) and 2(*f*) is produced by helically winding or rolling up the core sheets 10 into a plurality of layers in which the yoke portion 13 is, as illustrated in FIGS. 2(*c*) and 2(*d*), placed on the outer circumferential side thereof.

In a process to winding the core sheets 10, the whole of the yoke portion 13 of the core sheet 10 is, as illustrated in FIGS. 2(*c*) and 2(*d*), rolled under pressure to form the tapered portion 13 which has the plate thickness t gradually decreasing toward the outer circumference thereof, thereby facilitating the ease with which the core sheet 10 is helically rolled up.

The core stack 1 is, therefore, shaped to have the thickness t of the yoke portion 13 of the core sheet 10 which is different between the inner circumferential region 13*a* and the outer circumferential region 13*b*. The outer circumferential region 13*b* is thinner than the inner circumferential region 13*a*. When a longitudinal section of the core stack 1 taken in the radial direction, as illustrated in FIG. 2(*f*), is viewed, gaps S will be created between the layers of the outer circumferential edges of the yoke portions 13.

Basic Structure of Generator Housing GH

The generator housing GH serves as an outer housing for the ac generator G and a key structural element in this disclosure. The basic structure of the generator housing GH will be described below with reference to FIGS. 1(*a*) to 4. The two housings 2 constituting the generator housing GH are basically of a cup-shape as a whole to have the rotor GR and the stator GS disposed therein. The housings 2 have the spigot and socket joint mechanisms 21 in annular circumferential edges of openings thereof facing each other. The spigot and socket joint mechanisms 21 are formed as shoulder-shaped recesses to have outer circumferential corners (i.e., protrusions) thereof fit on the stator core E. The spigot and socket joint mechanism 21 serve to firmly retain the stator core E (i.e., the stator GS). The housings 2 have central portions of bottoms 22 thereof which retain the rotor GR to be rotatable.

The two housings 2 are of a similar cup shape as a whole, but different in detailed arrangements from each other. In the following discussion, one of the housings 2 will be referred to as a housing 2*a*, while the other housing 2 will be referred to as a housing 2*b* as needed. Exemplifying the difference, the housing 2*a* is equipped with screw holes 23 into which the fastening bolts F are screwed and the attachment stay 24. The housing 2*b* has through-holes 25 through which the fastening bolts F pass. The attachment stay 24 is to secure the ac generator G to an engine (not shown).

The core stack 1, as described above, has the gaps S, as illustrated in FIG. 2(*f*), in the outer circumferential edge thereof, thus leading to various problems arising from the gaps S when the core stack 1 is simply held by the housings 2.

Figure 4:
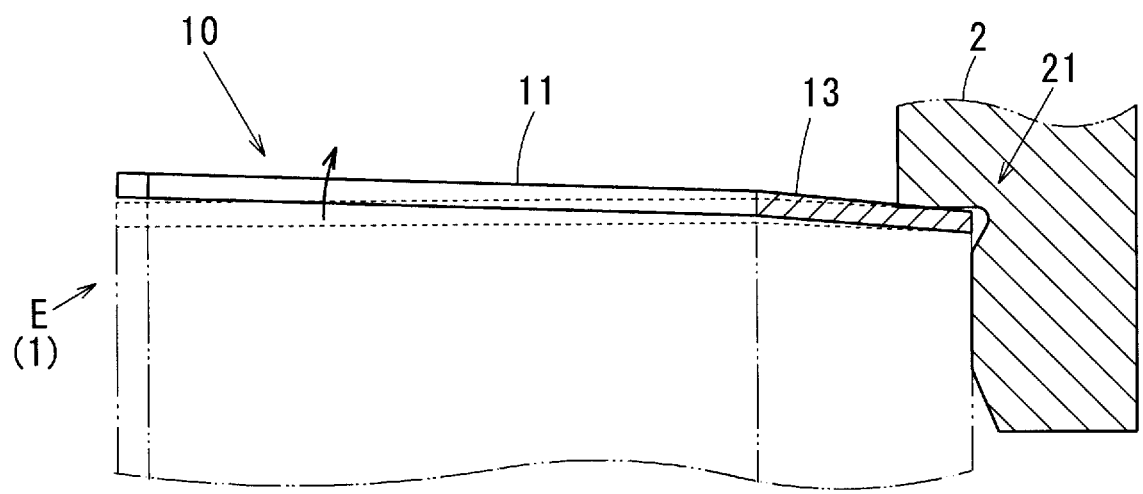
FIG. 4 is a schematically longitudinal sectional view of a stator mounting mechanism for explaining an object of this disclosure (reference example).

Here, the phenomenon where the core sheets 10 closer to the end surface of the core stack 1, especially portions of the core sheets 10 located inside the inner peripheries of the tooth portions 11 are, as demonstrated in FIG. 4, lifted up from a state indicated by a broken line to a state indicated by a solid line will be described below. According to the inventor's consideration of a mechanism of the above uplift, since the yoke portions 13 are made as a collection of tapered sections, the holding of the yoke portions 13 using the housings 2 to decrease the size of the gaps S will result in a difference in thickness between the stack of the yoke portions 13 and the stack of the tooth portions 11, which causes upper layers (and lower layers) of the yoke portions to be inclined in the stacking direction (i.e., a direction in which the tooth portions 11 are lifted up). Subsequently, when the yoke portions 13 are further pressed by pressure exerted by the housings 2 (i.e., fastening force), they will be buckled, so that tensile stress by which peripheral portions of the yoke portions 13 are attracted by middle portions thereof on which the pressure is exerted, thereby forming recesses. This causes the tooth portions 11 to be reflexed or bent along the recesses, which leads to additional inclination or lifting up of the tooth portions 11. Such lifting up of the core sheets 10 causes portions (i.e., the slant coil connecting portions D2) of the stator coil D covered with the insulators Z (especially, trumpet-shaped portions ZA of the insulators Z) to rub on corners of the slot portions 12 closer to the end surface of the core stack 1 regardless of an insulating mechanism shown in FIG. 3. This results in a risk that the insulators Z (especially, the trumpet-shaped portions ZA) become damaged, which may result in peeling of insulating coatings from the stator coil D.

The disclosure is to solve the various problems arising from the gaps S leading to the lifting-up phenomenon. As a measure to fully solve the problems resulting from the gaps S with use of a typical stator core structure, the housings 2 which form the generator housing GH has a unique structure in relation to the stator core E (i.e., the core stack 1). Such a structure will be described below in detail as first to third embodiments.

First Embodiment

Feature of Generator Housing GH

Figure 5A:
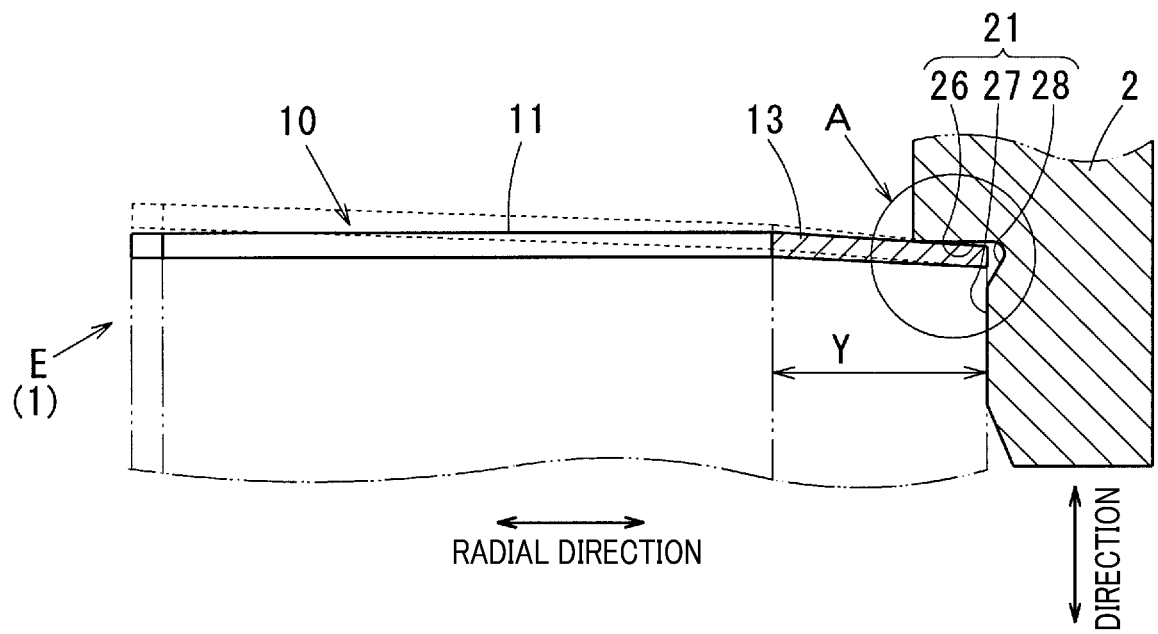
FIG. 5 is used for explaining an embodiment in this disclosure (first embodiment).
Figure 5B:
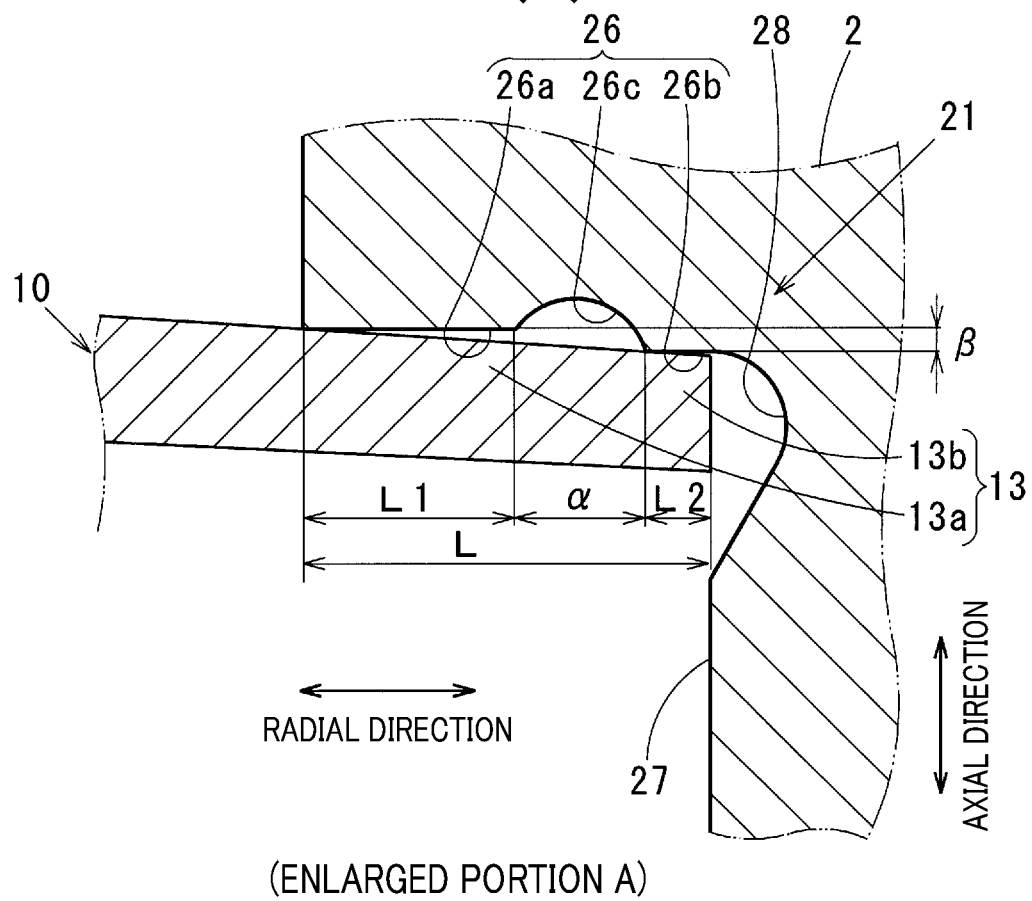

The housings 2 of the generator housing GH in this embodiment, as described already, basically have the spigot and socket joint mechanisms 21 in the form of a shoulder-shaped recess which has the feature. The specific structure of the spigot and socket joint mechanism 21 will be described in detail with reference to FIG. 5.

The spigot and socket joint mechanism 21 has the annular holding surface 26 as an orthogonal shoulder surface which nips the end surfaces of the stator core E in the axial direction and the cylindrical guide surface 27 which guides an outer peripheral surface of the stator core E. The surfaces 26 and 27 are arranged perpendicular to each other in an L-shape through the clearance groove 28.

The spigot and socket joint mechanism 21 adopts a novel structure to the annular holding surface 26 which holds the stator core E in the axial direction. Specifically, the holding surface 26 has two annular surfaces: the first annular surface 26a and the second annular surface 26b whose radial locations are different from each other and have the radial width L1 and the radial width L2, respectively. The two annular surfaces are concentric surfaces extending parallel to each other. The large-diameter second annular surface 26b is outwardly located away from the small-diameter first annular surface 26a by a distance a in the radial direction and bears a stepped relation with the first annular surface 16a where the second annular surface 26b projects from the first annular surface 26a by a height β in the axial direction. The annular surfaces 26a and 26b which are separate from each other by the distance a and different in level from each other by the height β in the axial direction are arranged adjacent each other in the radial direction through the concave-shaped step-to-step connecting portion 26c to form the holding surface 26.

In relation to the stator core E, the first annular surface 26a faces the inner circumferential region 13a of the yoke portion 13 of the stator core E, while the second annular surface 26b faces the outer circumferential region 13b of the yoke portion 13 in order for the holding surface 26 to pinch the yoke portions 13 of the stator core E in the axial direction.

The housings 2 each have the first annular surface 26a and the second annular surface 26b which individually contact the inner circumferential region 13a and the outer circumferential region 13b of the yoke portion of the stator core E, respectively, thereby holding the stator core E.

With the above arrangements in this embodiment, when the stator core E is held by the two housings 2 and then firmly joined together using the fastening bolts F, each of the housings 2 has two portions: one contacting an inner peripheral portion of the yoke portion 13 of the stator core E, and the other contacting an outer peripheral portion of the yoke portion 13 of the stator core E, thereby offering the following beneficial effects.

(1) If the above two contacting portions: one creating a contact of the first annular surface 26a with a portion of the yoke portion 13 in the inner circumferential region 13a is defined as a first contacting portion, and the other creating a contact of the second annular surface 26b with a portion of the yoke portion 13 in the outer circumferential region 13b is defined as a second contacting portion, the first and second contacting portions are different in axial location as well as radial location from each other. In other words, the second contacting portion which is located outside the first contacting portion in the radial direction protrudes in the axial direction by the height β, so that the second contacting portion is higher in level than the first contacting portion. Therefore, when the two housings 2 are placed to face each other, an interval between the second contacting portions of the housings 2 in the axial direction is smaller than that between the first contacting portions of the housings 2 in the axial direction by 2β. Such a difference in locations in the axial direction will cause the outer peripheral portion of each of the yoke portions 13 which is smaller in thickness and the inner peripheral portion of each of the yoke portions 13 which is greater in thickness to be pressed individually in the axial direction. The firm holding of the yoke portions 13 suitable for the configuration of cross sections of the yoke portions 13 is, therefore, ensured by optionally determining the difference (β) in level between the above contacting portions of the housings 2. This minimizes undesirable exertion of stress on the housings 2 or the fastening bolts F.

(2) The adverse effects of the gaps S may be alleviated by controlling the degree of axial force exerted on the first and second contacting portions.

In this embodiment, the difference β in level between the first contacting portion (i.e., a contact between the first annular surface 26a and the yoke portion 13 in the inner circumferential region 13a) and the second contacting portion (i.e., a contact between the second annular surface 26b and the yoke portion 13 in the outer circumferential region 13b) is set relatively small. This may create plastic deformation of the first contacting portion and elastic deformation of the second contacting portion. Specifically, when the housings 2 are uniformly fastened by the bolts F, a greater degree of axial force is applied to the first contacting portion, thus causing the whole of opposed surfaces of the first contacting portion to be pressed or compressed in the axial direction, so that the first contacting portion is plastically deformed, thereby fully attaching the stacked core sheets 10 close to each other. In contrast, the second contacting portion is elastically deformed only to an extent that a clearance between the adjacent core sheets 10 is decreased within a given range.

It is, therefore, possible to reduce the lifting up of the inner peripheral end surface of the stator core E causing damage the stator core D and also to substantially eliminate the gaps S, thereby solving the noise problem.

(3) The above plastic deformation results in full adhesion between the stacked core sheets 10, thereby completely sealing the inner circumferential regions 13a of the yoke portions 13. This eliminates a risk that the stator core E is flooded when it is used as a portion of the housing of the ac generator G.

(4) The maximum radial width L of the holding surface 26 is sufficiently smaller than the radial width Y of the yoke portions 13. The inner circumferential edge of the holding surface 26 is located outwardly away from the bottoms of the slot portions 12, thereby avoiding a physical interference of the first annular surface 26a which is located inside the second annular surface 26b in the radial direction with the stator coil D or the insulator Z.

(5) In an overall structural aspect, the spigot and socket joint mechanism 21 may be easily produced by reforming the circumferential edge of the opening of each of the housings 2 to nip the stator core E, thus enabling the core stack 1 which has a typical structure to be used as the stator core E without any changes thereto.

This embodiment is, as apparent form the above discussion, capable of providing the stator mounting mechanism which has a simple and inexpensive structure and makes the ac generator G which is higher in strength, quality, and performance.

Second Embodiment

Differences between the second embodiment and the first embodiment will be described below with reference to FIG. 6.

The feature of the stator mounting mechanism in the second embodiment is that a stepped configuration of the annular holding surface 26 is larger in size than that in the first embodiment.

Figure 6:
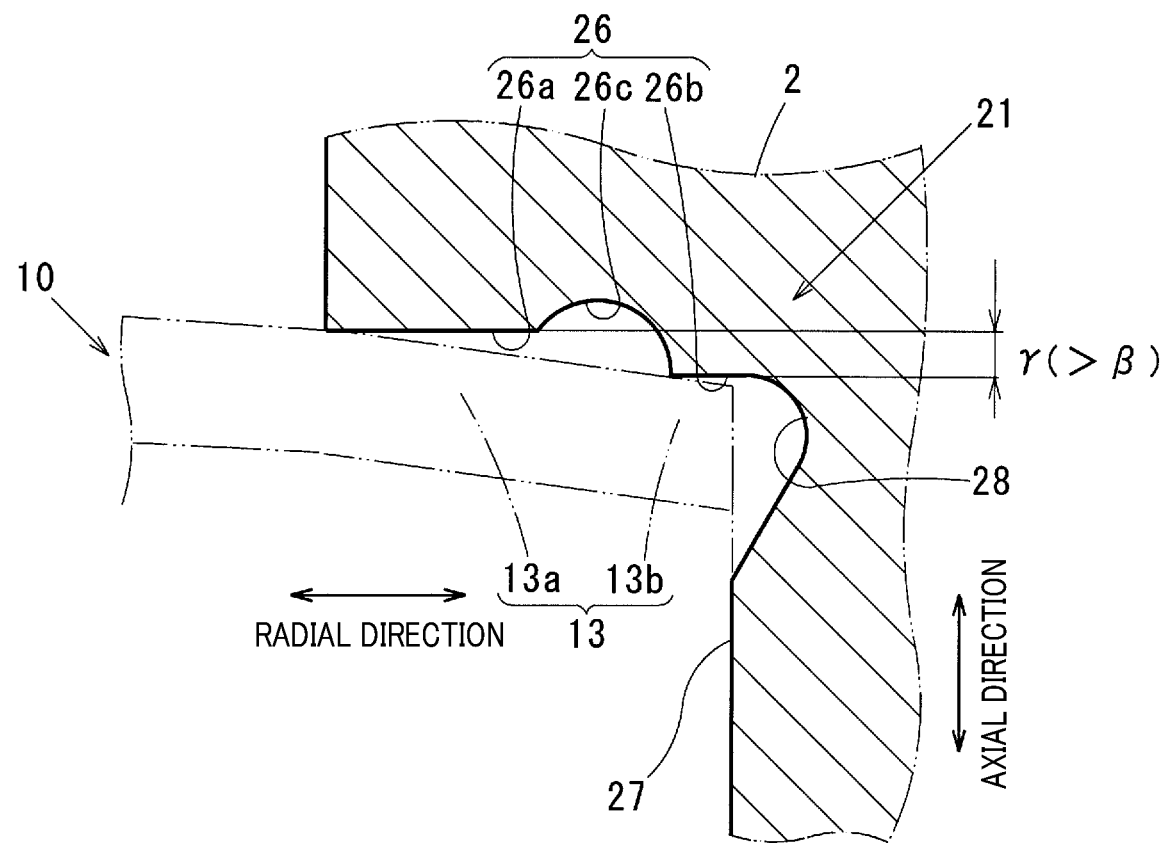
FIG. 6 is used for explaining another embodiment in this disclosure (second embodiment and a schematically longitudinal sectional view of highlights of a stator mounting mechanism.

The annular holding surface 26, as illustrated in FIG. 6, includes two concentric parallel surfaces: the first annular surface 26a and the second annular surface 26b which are different in diameter from each other. The large-diameter second annular surface 26b has a special stepped relation with the small-diameter first annular surface 26a in which the second annular surface 26b protrudes outside the first annular surface 26a in the axial direction by a height γ which is greater than the height β in the first embodiment. The stepped relation means a difference in level between the first contacting portion and the second contacting portion in the axial direction. The outer peripheral second contacting portion (i.e., a contact between the second annular surface 26b and the yoke portion 13 in the outer circumferential region 13b) protrudes in the axial direction from the inner peripheral first contacting portion (i.e., a contact between the first annular surface 26a and the yoke portion 13 in the inner circumferential region 13a) by the height γ. Therefore, when the two housings 2 are placed to face each other, an interval between the second contacting portions of the housings 2 in the axial direction is smaller than that between the first contacting portions of the housings 2 in the axial direction by 2γ.

With the arrangements in the second embodiment, the above difference in level will cause the outer peripheral portion of each of the yoke portions 13 which is smaller in thickness and the inner peripheral portion of each of the yoke portions 13 which is greater in thickness to be pressed individually in the axial direction. The firm holding of the yoke portions 13 suitable for the configuration of cross sections of the yoke portions 13 is, like in the first embodiment, achieved. The deformation characteristics (i.e., the plastic deformation region and the elastic deformation region) are inverse to those in the first embodiment. Specifically, when the housings 2 are uniformly fastened by the bolts F, a greater degree of axial force is applied to the outer peripheral second contacting portion, thus causing the whole of opposed surfaces of the second contacting portion to be pressed or compressed in the axial direction, so that it is plastically deformed, thereby fully attaching the stacked core sheets 10 close to each other in the outer peripheral region of the core stack 1. In contrast, the inner peripheral first contacting portion is elastically deformed only to an elastic deformation extent that the adjacent core sheets 10 are adjoined to each other without any clearance therebetween. The second contacting portions, therefore, serve to prevent the stator core E from being flooded.

Third Embodiment

Differences between the third embodiment and the first and second embodiments will be described below with reference to FIG. 7. The feature of the stator mounting mechanism in the third embodiment is that the two annular surfaces 26a and 26b which hold the core stack 1 are different in inclination from each other.

Figure 7:
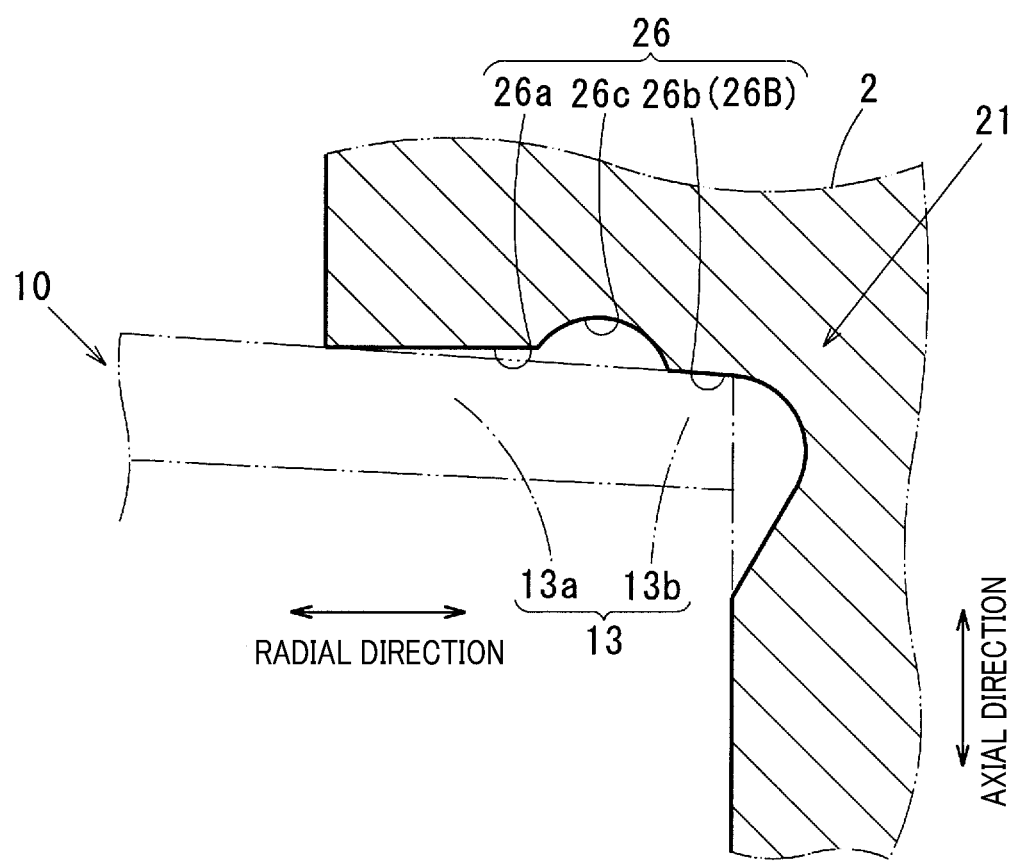
FIG. 7 is used for explaining another embodiment in this disclosure (third embodiment and a schematically longitudinal sectional view of highlights of a stator mounting mechanism.

The annular holding surface 26, as illustrated in FIG. 7, includes two stepped concentric surfaces: the first annular surface 26a and the second annular surface 26b which are different in diameter from each other. The small-diameter second annular surface 26a is a flat surface extending perpendicular to the axial direction, while the large-diameter second annular surface 26b is shaped as the tapered surface 26B which slants outwardly so as to protrude in the axial direction.

The above arrangements in the third embodiment achieve the firm holding of the yoke portions 13 more suitable for the configuration of cross sections of the yoke portions 13 than in the first and second embodiments. Specifically, each of the yoke portions 13 of the stator core E includes sections in the inner circumferential region 13a where the section is greater in thickness and the outer circumferential region 13b where the section is smaller in thickness. When the sections in the inner circumferential region 13a and the outer circumferential region 13b are individually pressed in the axial direction, the section in the outer circumferential region 13b will be more strongly compressed into a tapered form in the axial direction. This causes the second annular surface 26b (26B) to be more fully contoured to conform with the deformed section of the yoke portion 13 in the outer circumferential region 13b, thereby resulting in an increase in area of the second contacting portion (i.e., an area of contact between the second annular surface 26b and the yoke portion 13 in the outer circumferential region 13b). This improves the degree of design freedom depending upon adjustment of the axial force.

Otrher Embodiments and Modifications

The disclosure has referred to the three embodiments, however, the embodiments may be modified in various ways without departing from the principle of this disclosure. Modifications will be described as other embodiments.

(1) The above embodiments (i.e., the first to third embodiments) refer to the difference in level (i.e., the heights β and γ) between the first annular surface 26a and the second annular surface 26b of the holding surface 26 or the difference in inclination (i.e., a combination of the parallel surface and the tapered surface) between the first annular surface 26a and the second annular surface 26b in order to achieve the suitable holding of the yoke portions 13, but however, the radial width L1 or L2 or the interval a may be changed to increase or decrease an area of contact of the first or second contacting portion or the axial force acting thereon.

Figure 8A:
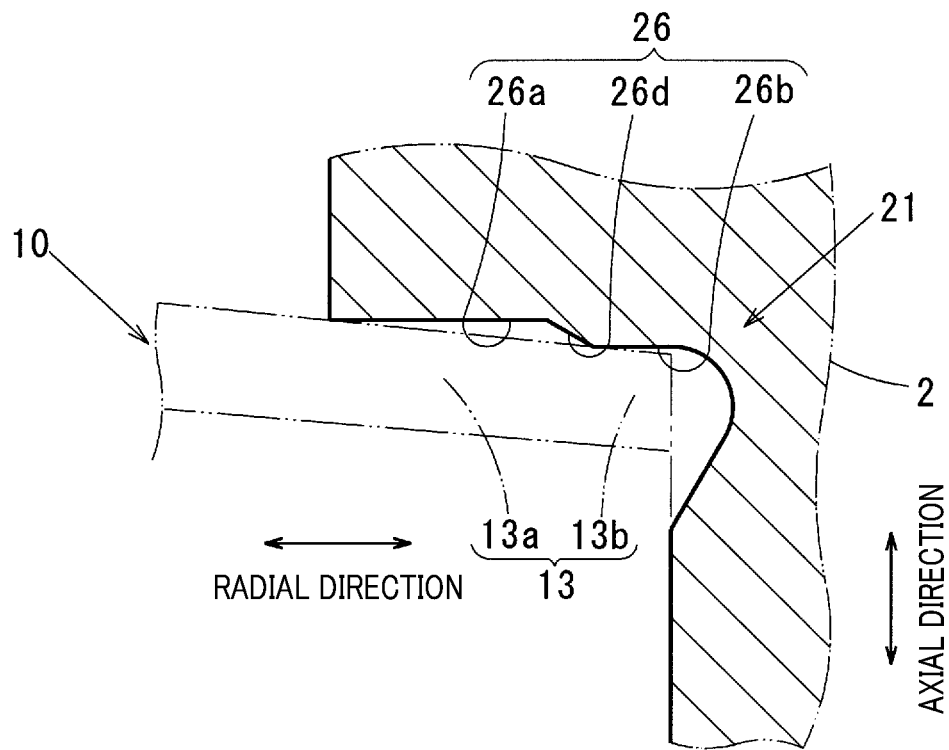
FIG. 8 is used for explaining modified forms of housings as other embodiments in this disclosure (modification).
Figure 8B:
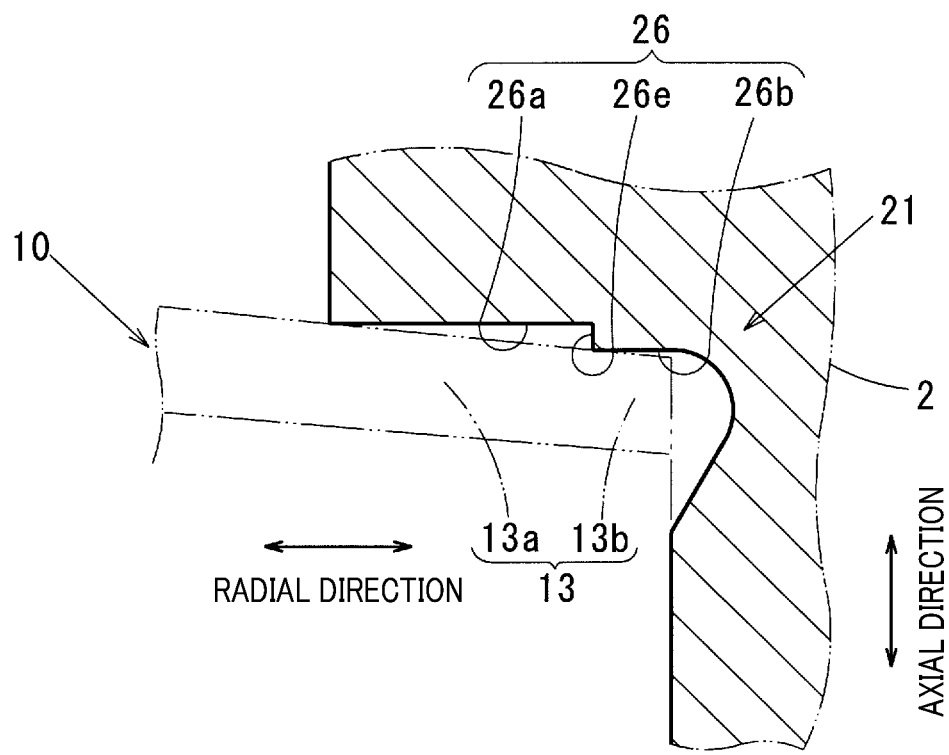

(2) The holding surface 26 in the above embodiments (i.e., the first to third embodiments) has the two annular surfaces 26a and 26b which are different in location both in the radial direction and in the axial direction and arranged adjacent each other in the radial direction through the step-to-step connecting portion 26c which is of a design-effective concave-shape, but however, the annular surfaces 26a and 26b may be, as illustrated in FIG. 8(a) or 8(b), adjoined together through a tapered step-to-step connecting portion 26d or an orthogonal step-to-step connecting portion 26e. Particularly, in the case of FIG. 8(b), the interval a between the annular surfaces 26a and 26b will be substantially zero. This is, therefore, useful in the case where the dimension of the holding surface 26 in the radial direction is selected to be small or the radial width γ of the yoke portions 13 is selected to be small.

Figure 9A:
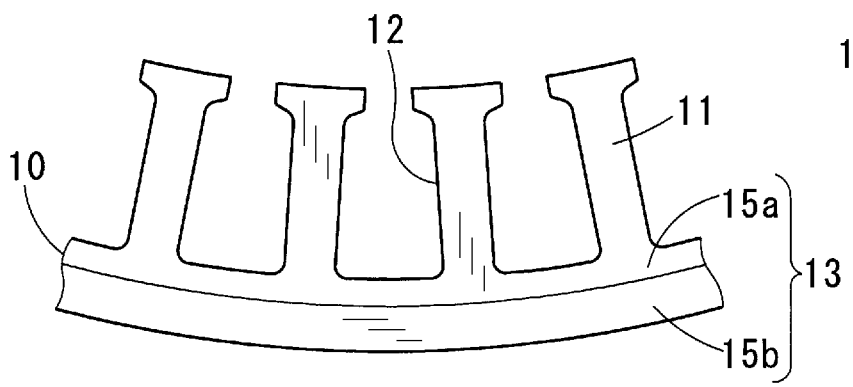
FIG. 9 is used for explaining a modification of a core sheet as another embodiment in this disclosure.
Figure 9B:
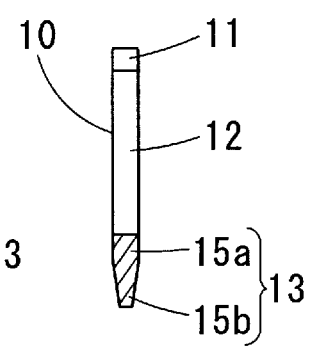

(3) In the above embodiments, the yoke portion 13 of each of the core sheets 10 which is overall shaped to have the tapered portion 14 ranging from the inner peripheral end to the outer peripheral end thereof is used to make the core stack 1, however, other types of yoke portions may be used to produce the core stack 1. For instance, the core sheets 10 may be used which include the yoke portions 13 each made up of, as illustrated in FIGS. 9(*a*) and 9(*b*), the tapered thin portion 15*b* and the non-tapered thick portion 15*a*. The tapered thin portion 15*b* has a thickness decreasing outwardly. The thick portion 15*a* has a constant thickness. The core sheets 10 are stacked so that the tapered thin portion 15*b* lies in the outer circumferential region 13*b*, and the thick portion 15*a* lies in the inner circumferential region 13*a* in the winding process to make the core stack 1. The thick portion (i.e., the non-tapered portion) 15*a* and the tapered thin portion 15*b* are placed in contact with the first annular surface 26*a* and the second annular surface 26*b*, respectively, but however, the first annular surface 26*b* may be placed to face in contact both with the thick portion 15*a* and the tapered thin portion 15*b*. Alternatively, the first annular surface 26*a* and the second annular surface 26*b* may be placed to face in contact with an inner peripheral area and an outer peripheral area of the tapered thin portion 15*b*, respectively.

(4) In the above embodiments, the joint of the housings 2 is, as illustrated in FIG. 1(*a*), achieved by fastening the bolts F to one of the housings 2, that is, the housing 2*a*, but however, it may be accomplished with a fastening mechanism using through-bolts and nuts.

(5) The housing of the ac generator G may be made only using the generator housing GH without use of a portion of the stator core E.

(6) The core stack 1 of the stator core E is usually used which has a structure in which outer peripheral edges of the core stack 1 are ironed in a finishing process following a stacking process shown in FIGS. 2(*e*) and 2(*f*) and then welded together to eliminate the gaps S. Such a type of core stack may be used to make the stator core E. In this case, the firm holding of the yoke portions suitable for the configuration of cross sections of the yoke portions may be achieved by controlling the axial force exerted on the first contacting portion (i.e., a contact between the first annular surface and the inner peripheral region of the yoke portion) and the second the second contacting portion (i.e., a contact between the second annular surface and the outer peripheral region).

INDUSTRIAL APPLICABILITY

The above embodiments refer to the automotive ac generator (i.e., the alternator), but however, may alternatively be used with a rotating electrical machine, such as a high-voltage driven motor, in which a stator core formed by a stack of core sheets made of magnetic core strips is firmly held by a pair of housings. This also offers substantially the same beneficial effects as described above.

The features in this disclosure and notable function effects, as described above in detail, will be summarized or listed below in relation to means recited in sub-claims.

Feature 1=Means in Claim 2

In the rotating electrical machine (G), as recited in claim 1, the housings (2, 2) are each formed in a region where the holding surface (26) which holds the stator core (E) in the axial direction does not interfere with the stator coil (D) (First to third embodiments).

The above means ensures the stability in holding the stator core (E) without causing damage to the stator coil (D).

Feature 2=Means in Claim 3

In the rotating electrical machine (G), as set forth in claim 1 or 2, the housings (2) are each formed to have the first annular surface (26*a*) and the second annular surface (26*b*) which constitute the holding surface (26) and are parallel surfaces different in location both in the radial direction and in the axial direction (see the first and second embodiments). This means achieves a firm holding feature by selecting a radial location and an axial location of the first annular surface (26*a*) and the second annular surface (26*b*).

Feature 3=Means in Claim 4

In the rotating electrical machine (G), as set forth in claim 1 or 2, the housings are each formed to have the first annular surface and the second annular surface which are different in geometry from each other (see the third embodiment). The first annular surface is a flat surface extending perpendicular to the axial direction, and the second annular surface is a tapered surface (26B) which slants outwardly and protrudes in the axial direction. This means enables the second annular surface (26*b*, 26B) to be contoured to conform with deformation of the yoke portion (13) of the stator core (E) in the outer circumferential region (13*b*). This results in an increase in area of the second contacting portion (i.e., an area of contact between the second annular surface 26*b* and the yoke portion 13 in the outer circumferential region 13*b*), thereby improving the degree of design freedom with respect to force fastening the stator core (E) and the housings (2, 2) together.

Feature 4=Means in Claim 5

In the rotating electrical machine (G), as set forth in any one of claims 1 to 4, the housings (2) are each formed to have the first annular surface (26*a*) and the second annular surface (26*b*) which are adjoined together in the radial and axial directions through a step-to-step connecting portion (26*c*, 26*d*, 26*e*) (see the first to third embodiments, and the modifications). This means enables the two surfaces which constitute the holding surface (26) to be optically arranged by selecting the concave-shaped step-to-step connecting portion (26*c*), the slant surface (i.e., tapered surface) step-to-step connecting portion or the orthogonal surface step-to-step connecting portion (26*e*) in terms of production or design aspect.

Feature 5=Means in Claim 6

In the rotating electrical machine (G), as set forth in any one of claims 1 to 5, when the stator core (E) is firmly held by the housings (2, 2), one of a first contacting portion and a second contacting portion creates an elastic deformation region, while the other creates a plastic deformation region (see the first to third embodiments). The first contacting portion is provided by a contact between the first annular surface (26*a*) and the yoke portion in the inner circumferential region. The second contacting portion is provided by a contact between the second annular surface (26*b*) and the yoke portion in the outer circumferential region. This means defines separate roles for the two contacting portions and achieves the desired holding feature.

What is claimed is:

1. A rotating electrical machine comprising:
   a stator core that is formed by a cylindrical core stack produced by winding and stacking magnetic plate-made core sheets in an annular form and includes tooth portions and slot portions provided on an inner peripheral side for coil winding and yoke portions provided on an outer peripheral side, the yoke portions connecting the tooth portions and the slot portions to form an annular magnetic path;
   a stator coil which is wound around the tooth portions and the slot portions of the stator core; and
   a pair of housings which nip axially opposed ends of the stator core,
   wherein the stator core is designed so that a thickness of the magnetic plate-made core sheets in the yoke portions is different between an inner peripheral region and an outer peripheral region, the thickness in the outer peripheral region being smaller than that in the inner peripheral region,
wherein the housings each have a cylindrical guide surface, which guides an outer peripheral surface of the stator core, and a holding surface, which holds the stator core in an axial direction, the holding surface including a first annular surface and a second annular surface, the first annular surface facing the inner peripheral region of the yoke portions, the second annular surface being located outside the first annular surface in a radial direction, protruding outside the first annular surface in the axial direction, and facing the outer peripheral region of the yoke portion,
wherein the housings hold the stator core by placing the first annular surfaces and the second annular surfaces in contact with the inner peripheral regions and the outer peripheral regions of the yoke portions in the axial direction, and
wherein the cylindrical guide surface and the holding surface are arranged perpendicular to each other, and a surface of the outer peripheral surface arranged in the axial direction is aligned with the cylindrical guide surface arranged in the axial direction.

2. The rotating electrical machine as set forth in claim 1, wherein the housings are each formed in a region where the holding surface which holds the stator core in the axial direction does not interfere with the stator coil.

3. The rotating electrical machine as set forth in claim 1, wherein the housings are each formed to have the first annular surface and the second annular surface which are parallel surfaces different in location both in the radial direction and in the axial direction.

4. The rotating electrical machine as set forth in claim 1, wherein the housings are each formed to have the first annular surface and the second annular surface which are different in geometry from each other, and wherein the first annular surface is a flat surface extending perpendicular to the axial direction, and the second annular surface is a tapered surface which slants outwardly and protrudes in the axial direction.

5. The rotating electrical machine as set forth in claim 1, wherein the housings are each formed to have the first annular surface and the second annular surface which are adjoined together in the radial and axial directions through a step-to-step connecting portion.

6. The rotating electrical machine as set forth in claim 1, wherein when the stator core is firmly held by the housings, one of a first contacting portion and a second contacting portion creates an elastic deformation region, while the other creates a plastic deformation region, the first contacting portion being a contact between the first annular surface and a yoke portion in the inner peripheral region, the second contacting portion being a contact between the second annular surface and a yoke portion in the outer peripheral region.

7. The rotating electrical machine as set forth in claim 1, wherein the magnetic plate-made core sheets are attached close to each other.

8. The rotating electrical machine as set forth in claim 1, wherein each of the magnetic plate-made core sheets has a thin portion which tapers outward in the outer peripheral region and a non-tapered thick portion in the inner peripheral region.

* * * * *